United States Patent [19]

Nilsson

[11] Patent Number: 4,559,257
[45] Date of Patent: Dec. 17, 1985

[54] LAMINATE TOGETHER WITH A METHOD FOR ITS MANUFACTURE

[75] Inventor: Erling I. Nilsson, Åkarp, Sweden

[73] Assignee: Tetra Pak Developpement SA, Pully, Switzerland

[21] Appl. No.: 639,538

[22] Filed: Aug. 9, 1984

Related U.S. Application Data

[63] Continuation of Ser. No. 458,941, Jan. 18, 1983.

[30] Foreign Application Priority Data

Jan. 20, 1982 [SE] Sweden ............... 8200290

[51] Int. Cl.⁴ .................. B32B 1/02; B32B 3/28; B32B 15/08
[52] U.S. Cl. .................. 428/152; 156/85; 156/212; 156/221; 264/292; 428/35; 428/458; 428/480; 428/910
[58] Field of Search ............ 428/152, 458, 480, 910, 428/178, 198, 35; 264/291, 292; 206/497; 53/427, 509; 156/85, 212, 221

[56] References Cited

U.S. PATENT DOCUMENTS

| 3,247,927 | 4/1966 | Cragg ................. 428/458 |
| 4,278,716 | 7/1981 | Buchner et al. ........ 428/458 |
| 4,287,248 | 9/1981 | Gessner et al. ........ 428/458 |
| 4,373,002 | 2/1983 | Peterson-Hoj ......... 428/910 |

Primary Examiner—Paul J. Thibodeau
Attorney, Agent, or Firm—Burns, Doane, Swecker & Mathis

[57] ABSTRACT

A laminate, including an aluminum foil layer and a polyester layer, has the aluminum foil layer wrinkled or contracted into a large number of wrinkles. These can be straightened out when the plastic material is stretched, without any breaking of the aluminum foil layer.

7 Claims, 6 Drawing Figures

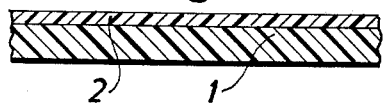
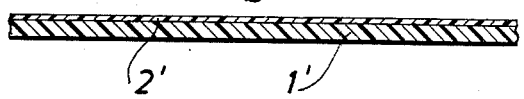
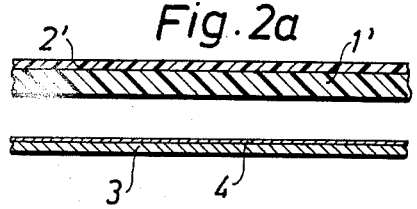
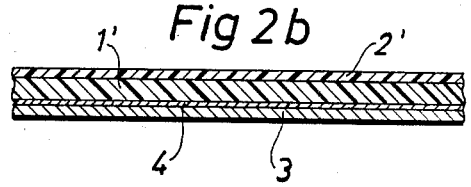
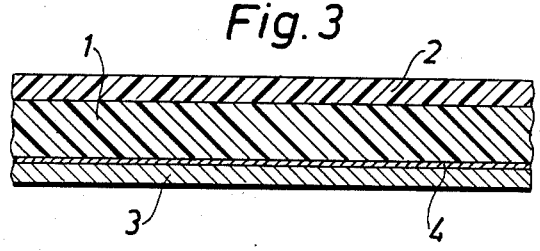
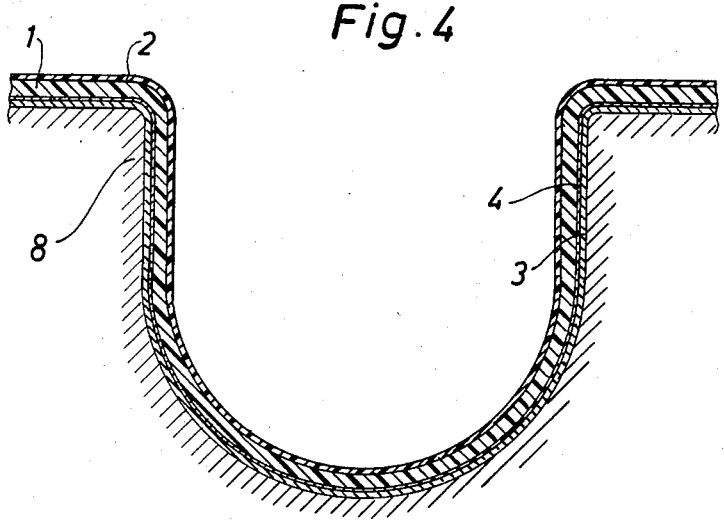

LAMINATE TOGETHER WITH A METHOD FOR ITS MANUFACTURE

This application is a continuation, of application Ser. No. 06/458,941, filed Jan. 18, 1983.

BACKGROUND AND SUMMARY OF THE PRESENT INVENTION

The present invention relates generally to packing material laminates and their manufacture. More specifically, the present invention relates to a laminate including a layer of a metal foil, in particular aluminium foil, together with one or more layers of plastic film. A method for the manufacture of such a laminate is also disclosed.

Aluminium foil has been used for a long time in connection with packaging as an item included in the laminate together with plastic material, or paper layers and plastic material. When a material for packaging of a certain product is chosen, the properties of the packing material must be adapted to the requirements of the product in respect of a protective barrier. A liquid product thus must be packed in a liquid-tight and liquid-resistant material, an oily product in an oil-resistant material and so on. In order to be able to seal the packages in an effective and convenient manner, the inside of the packing material is often provided with a heat-sealable plastic layer, and if stiffness of the packing material is required, a layer of paper or similar material is generally used. In other words a packing material is prepared, which has the properties which are desired, by laminating different material layers to each other. One characteristic that is desirable for many packing material combinations is tightness against gases, especially oxygen gas. Most plastic materials have poor oxygen gas barrier properties and it is for this reason, if gas-tightness is required, that in general a layer of metal foil, in particular aluminium foil, is incorporated in the packing laminate. An aluminium foil has outstanding gas-tightness characteristics even if the foil is extremely thin (e.g. 5 $\mu$m) and such an aluminium foil layer also provides optimum light-protection properties which are required in many cases. For this reason aluminium foil has found wide application as a constituent in packing laminates, especially in connection with the type of packages which are formed by folding, welding together to bags or cushions etc. It is a disadvantage of aluminium foil laminate of the aforementioned type, however, that it cannot be stretched or deep-drawn or at least deep-drawn only to a very small degree. Most plastic materials can be readily subjected to a plastic deformation by heating the plastic material, whereupon it can be formed through drawing, blowing etc., the forming taking place so that the surface of the plastic material is extended with simultaneous thickness reduction of the material. In the formation of a large number of packages a plastic material is formprocessed by stretching, deep-drawing or blowing so as to produce a cavity into which the contents can be introduced. If such a forming were to be carried out on a laminate including an aluminium foil layer, the aluminium foil layer would break almost immediately, as a result of which the gas-tightness characteristics would of course, be lost.

Since aluminium foil possesses many characteristics which are desirable in connection with packaging, attempts have been made to develop an aluminium laminate suitable for deep-drawing. In principle it is known that aluminium in thicker layers readily can be formed by deep-drawing, but the problem is that rolled foils of thicknesses of 5–10 $\mu$m break at relatively modest elongation. Successful attempts have been made, however, to manufacture relatively shallow troughs, plates and the like from laminated material comprising an aluminium foil, and a report on these experiments was published in the journal Verpackungsrundschau no. 4 of the year 1977 (N. Buchner, D. Liede, W. Brose—Aluform—Eineneue Packung aus Aluminiumkunststoff vebunden). In this paper an account is given, among other things, of how the constitutional structure of the aluminium material affects the deep-drawing capacity of the material. A curve is also included showing the breaking elongation of aluminium foil as a function of the thickness of the aluminium foil. It is evident from this curve that the breaking elongation for aluminium foil of a thickness of 5–10 $\mu$m is as low as 2–3%, while the breaking elongation of aluminium foil with a thickness of 140 $\mu$m is as high as 32%, after which the breaking elongation, in principle, does not increase with increasing thickness of the aluminium foil. In the article it is also explained, how the deep-drawing capacity of a laminate containing aluminium foil can be increased by attaching the aluminium foil in the laminate to a polypropylene film, which imparts a very good and uniform transfer of tensile strength to the aluminium foil during further form-processing.

The problem which has been stated has been solved by the present invention which has the characteristics furnished in the description below.

BRIEF DESCRIPTION OF THE DRAWING

In the following the invention will be described with reference to the enclosed schematic drawings, wherein FIG. 1 (a) and (b) are greatly enlarged crosssectional views of a plastic laminate before and after an orientation stretching.

FIG. 2 (a) and (b) are cross-sectional view of the oriented laminate in accordance with FIG. 1(b) joined together with an aluminium foil and a plastic coating combined with the aluminium foil.

FIG. 3 is a cross-sectional view of the laminate in accordance with the invention after the platic foil, stretched earlier, has been made to shrink again, and FIG. 4 is a cross-sectional view of the laminate in accordance with FIG. 3 being expanded, for example, by deep drawing.

DETAILED DESCRIPTION OF THE PREFERRED EMBODIMENT

In the manufacture of the laminate in accordance with the invention it is assumed, in the present case, that the plastic portion consists of a polyester film 1 which has a coating 2 of so-called glycol-modified polyester (PETG). The laminate in accordance with the invention may be manufactured using other plastic materials, e.g. polypropylene, polyethylene, polyvinyl chloride etc., but since the polyester material has certain characteristics which are desirable in many cases, we chose to describe the invention on the basis of polyester (PET) as the plastic constituent of the laminate.

It is known that polyester can be given very good tensile strength if the material is molecular-oriented through stretching. Unfortunately the material then obtains a mainly crystalline molecular structure which means that the material cannot be heat-sealed. In recent times, however, a so-called glycol-modified polyester material (PETG) has been put forward, which largely retains its amorphous structure, even after orientation stretching. This material consequently is heat-sealable after the orientation stretching, provided the stretching is not carried too far. This material does not acquire the same tensile strength as the oriented, crystalline polyester however. The two materials PET and PETG are so similar in character, however, that they can be readily combined by surface fusion and it is also possible by one and the same extrusion process (co-extrusion) to extrude a film consisting of one layer of PET and one or more layers of PETG. Such a material combination is shown in FIG. 1 (a). The laminate in accordance with FIG. 1(a) may be subjected to a monoaxial or biaxial stretching at a temperature not exceeding 90° C. The result of this stretching operation will be, of course, that the material, which is shown in FIG. 1(b), will become thinner, at the same time as the surface of the stretched material is enlarged. Moreover, the layer 1 is molecular-oriented so as to form the oriented layer 1' which has a substantially better tensile strength than the non-oriented layer 1 in FIG. 1 (a).

If the laminate in accordance with FIG. 1 (b) is heated to 90° C. or more, the built-in stresses, which are produced during the molecular orientation, will be released, and the material will shrink until, in principle, it has returned to its original shape. This means that an aluminium foil which is to be laminated to the material has to be combined with the laminate in accordance with FIG. 1 (b), without the same being heated to such a degree that the orientation stresses are released and the material is caused to shrink. In accordance with FIG. 2 (a) the laminate in accordance with FIG. 1(b) is to be combined with the aluminium foil 4, which in general is so thin (5–10 μm) that in order to be handled it has to be covered first with a plastic coating 3. This plastic coating 3 may be constituted of polyethylene and it may be very thin, but it may also be constituted of PETG material. If the surface layers of thr final laminate should be capable of being sealed to one another, for example for the formation of a pipe, it is appropriate instead to cover the aluminium foil layer 4 with a layer 3 of PETG. The PETG layer may be constituted either of a very thin coating which without difficulty can be made to shrink together with the layer 1', but it may also consist of a PETG film, orientation-stretched in advance. This film is laminated to the aluminium foil 4 with the help of an intermediary adhesive layer. As mentioned earlier, the "primary laminate" of PET and PETG cannot be heated in connection with the lamination of the aluminium foil, since the oriented laminate, otherwise, would be caused to shrink. Instead it is appropriate to join together the aluminium foil layer 4 with the oriented PET layer 1' with the help of an intermediary adhesive coating, e.g. glue (EVA-glue) or a varnish, at a temperature remaining below the shrinkage temperature of the laminate. It is important, however, to obtain a very good attachment between the aluminium foil layer 4 and the orientation-stretched PET layer 1', since otherwise delaminations may occur in connection with the shrinkage of the laminate.

When the laminate in accordance with FIG. 2(b) has been c ompleted, the whole laminate is heated uniformly so as to cause it to shrink to its original dimensions. This heating may be done so that the laminate is immersed in a liquid which previously has been heated to a temperature exceeding the shrinkage temperature of the laminate, or else the laminate can be passed through a warm oven of a corresponding temperature. The extent to which the laminate shrinks will depend, of course, on the original stretching of the "primary laminate". In the case of polyester it is readily possible to stretch the material 4 to 5 times its original length in both longitudinal and transverse direction. This may mean a surface enlargement of the material during the stretching operation of up to 25 times, and thus a corresponding surface reduction when the laminate is shrunk.

When the laminate in accordance with FIG. 2(b) is heated a shrinkage will take place, as mentioned earlier. This in principle corresponds to the previous stretching, and the shrunk laminate is shown in FIG. 3. This shrinkage operation means, of course, that the thickness of the laminate increases at the same time as its surface diminishes. What happens with the aluminium foil layer 4 is that it is wrinkled or contracted to a great number of wrinkles or contraction points which are so small that they cannot be conceived with the naked eye. Purely optically the contraction expresses itself in such a manner that the earlier mirrorlike aluminium foil becomes duller and loses its gloss. If the adhesion between the aluminium layer and the remaining material layers is good, however, the bond between the plastic layer and the aluminium foil will be retained along the whole of the surface of the aluminium foil.

The laminate in accordance with FIG. 3 now can be used for the manufacture of deep-drawn objects and in FIG. 4 is shown an example of such a deep-drawing. In the deep-drawing operation the laminate is heated in known manner to such a degree that the plastic material is caused to melt, whereupon the laminate is formed with the help of a forming plunger or with the help of compressed air or vacuum to lie accurately against a mould 8. In the present case it had to be ensured that any stretching of the laminate in accordance with FIG. 3 during the forming in accordance with FIG. 4 does not at any point exceed the shrinkage of the material which has taken place earlier. Practical experiments have shown that the laminate in accordance with FIG. 3 can be stretched almost to the same extent as that to which the laminate previously has been shrunk, that is to say so, that the wrinkles or contractions of the aluminium foil are "straightened out". This stretching limit must not be exceeded, though, since the aluminium foil would then break immediately.

It has been found that, through the application of the invention and utilization of the laminate in accordance with FIG. 3, a deepdrawing effect can be attained which is more than 10 times greater than what has been achieved previously and which has been reported in the journal Verpackungsrundschau mentioned earlier. Such an increase in deep-drawing capacity of an aluminium laminate is, of course, of great commercial and practical value and it is possible with the help of the invention to manufacture e.g. preserve jars with an aluminium foil thickness of 5 μm or 5/1000 mm, whereas the wall thickness of a normal aluminium preserve jar in general is not less than 1/10 mm, that is to say a twentyfold reduction of the container thickness.

The embodiment of the invention described here relates to a laminate between polyester and aluminium foil, but, as mentioned earlier, it is readily possible to apply the invention also to other laminate combinations. Thus it is possible to start from a co-extruded threelayer material with a central layer of PET which on both sides has coating layers of PETG and, after the stretching operation, laminate an aluminium foil layer to one of the PETG layers with the help of a varnish, whereupon a further PETG layer may be extruded onto the aluminium foil layer.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A packing material laminate for use in manufacturing packing containers, comprising: a polyester layer; a first glycol-modified polyester layer bound to a first side of said polyester layer; a metal foil layer bound to a second side of said polyester layer; and a second glycol modified polyester layer bound to the free surface of said metal foil layer, said metal foil layer being wrinkled and thereby being able to be expanded, without tearing, when the laminate is stretched upon formation of a packing container from the laminate.

2. The laminate of claim 1 further comprising:
   a first adhesive layer disposed between said polyester layer and said metal foil layer; and
   a second adhesive layer disposed between said metal foil layer and said second glycol-modified polyester layer, said adhesive layers forming bonds along the surfaces of the foil to inhibit delamination of said metal foil layer from said polyester and glycol-modified polyester layers upon wrinkling of said metal foil.

3. The laminate in accordance with claim 2 wherein said metal foil layer is aluminum foil.

4. A method of manufacturing a laminated packing material for use in manufacturing packing containers, comprising: providing the laminate with three layers of plastic film so as to define a central plastic layer and two outer plastic layers; orientation-stretching at least one of said three layers of plastic film; laminating an aluminum foil layer to said orientation-stretched layer; adhering the aluminum foil layer to one surface of the central plastic layer and the two outer plastic layers being adhered to the other surface of the central plastic layer and the other surface of the aluminum foil layer; the central layer being crystalline polyester and the two outer layers of the laminate being amorphous, glycol-modified polyester; uniformly heating said laminate once so as to cause said orientation-stretched layer to shrink and thereby wrinkle said aluminum foil layer; deep-drawing said shrunk laminate to stretch said laminate into the shape of a packing container; and controlling said deep-drawing to substantially straighten out said wrinkles and expand said aluminum foil layer without tearing said foil layer.

5. The laminate in accordance with claim 4 wherein the metal foil layer is attached to an adjacent plastic film to form a bond between the foil layer and the plastic layer along the surface of the foil.

6. The laminate in accordance with claim 4, wherein the metal foil layer is attached to said plastic layers with the help of an intermediary adhesion layer.

7. The method in accordance with claim 4, wherein the lamination is performed with the help of an adhesion varnish or a glue.

* * * * *